US008886909B1

(12) United States Patent
De Forest et al.

(10) Patent No.: US 8,886,909 B1
(45) Date of Patent: Nov. 11, 2014

(54) METHODS, SYSTEMS, AND COMPUTER READABLE MEDIUM FOR ALLOCATING PORTIONS OF PHYSICAL STORAGE IN A STORAGE ARRAY BASED ON CURRENT OR ANTICIPATED UTILIZATION OF STORAGE ARRAY RESOURCES

(75) Inventors: Miles Aram De Forest, Bahama, NC (US); Charles Christopher Bailey, Durham, NC (US); Michael D. Haynes, Raleigh, NC (US); David Haase, Fuquay Varina, NC (US); Jackson Brandon Myers, Cary, NC (US); Dipak Prasad, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 613 days.

(21) Appl. No.: 12/100,514

(22) Filed: Apr. 10, 2008

Related U.S. Application Data

(60) Provisional application No. 61/066,144, filed on Mar. 31, 2008.

(51) Int. Cl.
*G06F 12/00* (2006.01)
*G06F 13/00* (2006.01)
*G06F 13/28* (2006.01)
*G06F 9/46* (2006.01)

(52) U.S. Cl.
USPC ........... 711/170; 711/112; 711/114; 711/154; 711/111; 711/100; 711/147; 711/148; 718/104

(58) Field of Classification Search
None
See application file for complete search history.

(56) References Cited

U.S. PATENT DOCUMENTS

| 5,604,902 | A | 2/1997 | Burkes et al. |
| 6,681,242 | B1 | 1/2004 | Kumar et al. |
| 6,880,062 | B1 * | 4/2005 | Ibrahim et al. ................ 711/202 |
| 7,284,244 | B1 | 10/2007 | Sankaranarayan et al. |
| 7,340,522 | B1 * | 3/2008 | Basu et al. .................... 709/226 |
| 7,406,484 | B1 * | 7/2008 | Srinivasan et al. ................ 1/1 |
| 7,463,648 | B1 | 12/2008 | Eppstein et al. |
| 7,480,912 | B2 * | 1/2009 | Arnold et al. ................ 718/104 |
| 7,577,692 | B1 * | 8/2009 | Corbett et al. ................ 1/1 |
| 7,702,873 | B2 * | 4/2010 | Griess et al. ................ 711/170 |
| 7,814,128 | B2 | 10/2010 | Silvers et al. |

(Continued)

OTHER PUBLICATIONS

Official Action for U.S. Appl. No. 12/164,959 (Sep. 12, 2011).

(Continued)

*Primary Examiner* — Sanjiv Shah
*Assistant Examiner* — Marwan Ayash
(74) *Attorney, Agent, or Firm* — Jenkins, Wilson, Taylor & Hunt, P.A.

(57) ABSTRACT

Systems, methods, and computer readable medium for allocating physical storage in a disk array are disclosed. According to one aspect, the subject matter described herein includes a method for allocating portions of storage area of a storage array. The method includes receiving, from a requesting entity, a request for allocation of a portion of storage area of a storage array, the storage array comprising a plurality of storage entities and a plurality of data buses for transferring data to and from the plurality of storage entities, wherein the plurality of storage entities are organized into at least one logical unit, wherein each logical unit is subdivided into at least one slice. In response to receiving the request for allocation, at least one slice is selected for allocation for use by the requesting entity, based on anticipated system resource utilization during access to data to be stored in the storage array.

20 Claims, 5 Drawing Sheets

(56) References Cited

U.S. PATENT DOCUMENTS

| | | | |
|---|---|---|---|
| 7,849,180 B2 | 12/2010 | Sawyer et al. | |
| 8,140,821 B1 | 3/2012 | Raizen et al. | |
| 8,191,125 B2 | 5/2012 | Dellow et al. | |
| 8,407,445 B1 | 3/2013 | Pathak et al. | |
| 8,443,163 B1 | 5/2013 | Bailey et al. | |
| 8,443,369 B1 | 5/2013 | Bailey et al. | |
| 8,473,678 B1 | 6/2013 | Rajasekaran et al. | |
| 8,745,327 B1 | 6/2014 | Throop et al. | |
| 2001/0049779 A1 | 12/2001 | Shimada et al. | |
| 2003/0056073 A1* | 3/2003 | Zeiger | 711/170 |
| 2003/0131165 A1 | 7/2003 | Asano et al. | |
| 2004/0039891 A1 | 2/2004 | Leung et al. | |
| 2004/0054850 A1 | 3/2004 | Fisk | |
| 2004/0098537 A1 | 5/2004 | Serizawa | |
| 2004/0153606 A1 | 8/2004 | Schott | |
| 2004/0181476 A1 | 9/2004 | Smith et al. | |
| 2004/0243699 A1 | 12/2004 | Koclanes et al. | |
| 2005/0193231 A1* | 9/2005 | Scheuren | 714/5 |
| 2005/0273556 A1 | 12/2005 | Gellai et al. | |
| 2006/0010290 A1 | 1/2006 | Sasamoto | |
| 2006/0085471 A1 | 4/2006 | Rajan et al. | |
| 2006/0112247 A1 | 5/2006 | Ramany et al. | |
| 2006/0143424 A1* | 6/2006 | Matsuzaki et al. | 711/170 |
| 2007/0043842 A1* | 2/2007 | Chouanard et al. | 709/223 |
| 2007/0143563 A1 | 6/2007 | Pudipeddi et al. | |
| 2007/0185934 A1 | 8/2007 | Cannon et al. | |
| 2008/0082593 A1 | 4/2008 | Komarov et al. | |
| 2009/0034107 A1 | 2/2009 | Posamentier | |
| 2009/0064159 A1 | 3/2009 | LaFrese et al. | |
| 2009/0077327 A1 | 3/2009 | Hara | |
| 2009/0089516 A1 | 4/2009 | Pelts et al. | |
| 2009/0248763 A1* | 10/2009 | Rajan et al. | 707/204 |
| 2009/0276588 A1 | 11/2009 | Murase | |
| 2009/0292870 A1 | 11/2009 | Sambe et al. | |
| 2009/0307424 A1 | 12/2009 | Galloway et al. | |
| 2010/0153641 A1 | 6/2010 | Jagadish et al. | |
| 2010/0262802 A1 | 10/2010 | Goebel et al. | |
| 2010/0299495 A1 | 11/2010 | Frank | |
| 2011/0145609 A1 | 6/2011 | Berard et al. | |
| 2011/0191536 A1 | 8/2011 | Mizuno et al. | |

OTHER PUBLICATIONS

Commonly Assigned, Co-pending U.S. Appl. No. 13/168,329 for "Methods, Systems, and Computer Readable Medium for Controlling Prioritization of Tiering and Spin Down Features in a Data Storage System" (Unpublished, filed Jun. 24, 2011).

Commonly-assigned, Co-pending U.S. Appl. No. 12/826,434 for "Managing Multi-Tiered Storage Pool Provisioning," (Unpublished filed Jun. 29, 2010).

Commonly Assigned, Co-pending U.S. Appl. No. 12/826,385 for "Systems, Methods, and Computer Readable Media for Compressing Data at a Virtually Provisioned Storage Entity" (Unpublished, Filed Jun. 29, 2010).

Commonly Assigned, Co-pending U.S. Appl. No. 12/824,816 for "Methods, Systems, and Computer Readable Medium for Tier-Based Data Storage Resource Allocation and Data Relocation in a Data Storage Array" (Unpublished, Filed Jun. 28, 2010).

Commonly Assigned, Co-pending U.S. Appl. No. 12/751,685 for "Systems, Methods, and Computer Readable Media for an Adaptative Block Allocation Mechanism" (Unpublished, Filed Mar. 31, 2010).

Commonly Assigned, Co-pending U.S. Appl. No. 12/164,959 for "Methods, Systems, and Computer Readable Medium for Dynamic, Policy-Based Allocation of System Resources" (Unpublished, Filed Jun. 30, 2008).

Non-Final Official Action for U.S. Appl. No. 12/751,665 (May 8, 2012).

Non-Final Official Action for U.S. Appl. No. 12/751,685 (Feb. 14, 2012).

Notice of Allowance and Fee(s) Due for U.S. Appl. No. 12/826,434 (Mar. 7, 2013).

Non-Final Office Action for U.S. Appl. No. 12/826,385 (Mar. 5, 2013).

Interview Summary for U.S. Appl. No. 12/826,385 (Mar. 1, 2013).

Notice of Allowance and Fee(s) Due for U.S. Appl. No. 12/824,816 (Jan. 17, 2013).

Notice of Allowance and Fee(s) Due for U.S. Appl. No. 12/164,959 (Jan. 11, 2013).

Notice of Allowance and Fee(s) Due for U.S. Appl. No. 12/751,665 (Nov. 16, 2012).

Non-Final Official Action for U.S. Appl. No. 12/824,816 (Sep. 14, 2012).

Interview Summary for U.S. Appl. No. 12/751,665 (Aug. 20, 2012).

Non-Final Official Action for U.S. Appl. No. 12/164,959 (Jul. 24, 2012).

Final Official Action for U.S. Appl. No. 12/751,685 (Jun. 27, 2012).

Non-Final Official Action for U.S. Appl. No. 12/826,434 (Jun. 13, 2012).

Non-Final Office Action for U.S. Appl. No. 13/168,329 (Oct. 7, 2013).

Final Office Action for U.S. Appl. No. 12/826,385 (Sep. 10, 2013).

Non-Final Office Action for U.S. Appl. No. 12/751,685 (Apr. 10, 2014).

Non-Final Office Action for U.S. Appl. No. 12/826,385 (Feb. 20, 2014).

Notice of Allowance and Fee(s) Due for U.S. Appl. No. 13/168,329 (Jan. 27, 2014).

\* cited by examiner

METHODS, SYSTEMS, AND COMPUTER READABLE MEDIUM FOR ALLOCATING PORTIONS OF PHYSICAL STORAGE IN A STORAGE ARRAY BASED ON CURRENT OR ANTICIPATED UTILIZATION OF STORAGE ARRAY RESOURCES

RELATED APPLICATIONS

This application claims the benefit of U.S. Provisional Patent Application Ser. No. 61/066,144 filed Mar. 31, 2008; the disclosure of which is incorporated herein by reference in its entirety.

TECHNICAL FIELD

The subject matter described herein relates to allocating physical storage in a storage array. More particularly, the subject matter described herein relates to methods, systems, and computer readable medium for allocating physical storage in a storage array.

BACKGROUND

A traditional storage array (herein also referred to as a "disk storage array", "disk array", or simply "array") is a collection of hard disk drives operating together logically as a unified storage device. Storage arrays are designed to store large quantities of data. Storage arrays typically include one or more storage array processors (SPs), for handling both requests for allocation and input/output (I/O) requests. An SP is the controller for and primary interface to the storage array.

Performance of a storage array may be characterized by the array's total capacity, response time, and throughput. The capacity of a storage array is the maximum total amount of data that can be stored on the array. The response time of an array is the amount of time that it takes to read data from or write data to the array. The throughput of an array is a measure of the amount of data that can be transferred into or out of (i.e., written to or read from) the array over a given period of time.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

One factor that may limit the performance of a storage array is the performance of each individual storage component. For example, the read access time of a disk storage array is constrained by the access time of the disk drive from which the data is being read. Read access time may be affected by physical characteristics of the disk drive, such as the number of revolutions per minute of the spindle: the faster the spin, the less time it takes for the sector being read to come around to the read/write head. The placement of the data on the platter also affects access time, because it takes time for the arm to move to, detect, and properly orient itself over the proper track (or cylinder, for multihead/multiplatter drives). Reducing the read/write arm swing reduces the access time. Finally, the type of drive interface may have a significant impact on overall disk array storage. For example, a multihead drive that supports reads or writes on all heads in parallel will have a much greater throughput than a multihead drive that allows only one head at a time to read or write data.

Furthermore, even if a disk storage array uses the fastest disks available, the performance of the array may be unnecessarily limited if only one of those disks may be accessed at a time. In other words, performance of a storage array, whether it is an array of disks, tapes, flash drives, or other storage entities, may also be limited by system constraints, such the number of data transfer buses available in the system and the density of traffic on each bus.

Thus, to maximize performance of a storage array, the operational load should be more or less evenly distributed across all physical resources, so that each physical resource may operate at its own maximum capacity. Using a disk storage array as an example, bandwidth, and thus performance, is maximized if "all spindles are being accessed at the same time."

Performance of a storage array may also be characterized by the total power consumption of the array. The administrator of a storage array may prefer to operate the array in a manner that minimizes power consumption ("green" mode) rather than maximizes performance ("brown" mode). Operating a large storage array in green mode may not only reduce power consumption of the array itself and its associated costs but also may have indirect benefits associated with the reduction of heat being generated by the array. For example, storage arrays typically are housed in an environmentally-controlled room or site; operating an array in green mode may reduce the heat that the air conditioning system must remove, thus lowering the cost to run the site HVAC system. Furthermore, semiconductor devices age faster in hot environments than in cold environments; a storage device, whether it is a hard disk drive, flash drive, or other, will age faster if it is mounted in a rack such that it is surrounded by other heat-generating storage devices than if it is in the same rack but surrounded by cool (e.g., idle) storage devices. Thus, operating a storage array in green mode may increase the mean time between failure for the devices in the array.

Separate from but intimately related to performance maximization is the problem of underuse of scarce physical resources. Storage arrays are typically used to provide storage space for one or more computer file systems, databases, applications, and the like. For this and other reasons, it is common for storage arrays to be logically partitioned into chunks of storage space, called logical units, or LUs. This allows a unified storage array to appear as a collection of separate file systems, network drives, and/or volumes.

Historically speaking, there is a trend toward larger operating systems, larger applications or programs, and larger file sizes. For example, the footprint of a popular operating system for personal computers has grown from megabytes of disk space to gigabytes of disk space for a basic installation. Programs and applications are getting larger as well. With the advent of the internet, it is popular to store multimedia files that are megabytes or gigabytes in size, up from the typical file size in kilobytes of a decade ago. Understanding this trend, a storage administrator is likely to provision a larger portion of storage area than is currently required for an operating system, for example, with the expectation that the space requirements will grow with upgrades, bug-fixes, and the inclusion of additional features.

The problem of underuse arises when, for example, an amount of storage space is allocated to, but not used by, an operating system, program, process, or user. In this scenario, the scarce (and probably expensive) resource—disk storage space, for example—is unused by the entity that requested its allocation and thus unavailable for use by any other entity. In many cases, the unused space cannot be simply given back. For example, a database installation may require many terabytes of storage over the long term even though only a small fraction of that space may be needed when the database is first placed into operation. In short, it is often the case that the large storage space will be eventually needed, but it is not known exactly when the entire space will be needed. In the meantime, the space lies unused and unavailable for any other use as well.

Recognizing that more storage space may be provisioned for operating systems, programs, and users than they may actually use at first, the concept of a sparsely populated or "thin" logical unit (TLU) was developed. Unlike the more traditional "fat" or fully allocated logical unit (FLU), which is created by provisioning and allocating a certain amount of storage area, a TLU is provisioned at creation but is not allocated any physical storage until the storage is actually needed. For example, physical storage space may be allocated to the TLU upon receipt of an I/O write request from a requesting entity, referred to herein as a "host". Upon receipt of the write request from the host, the SP may then determine whether there is enough space already allocated to the TLU to store the data being written, and if not, allocate to the TLU additional storage space.

While thin logical units provide distinct advantages over fully allocated logical units (i.e., where the entire storage space requested is actually allocated and reserved for the exclusive use of the requesting entity), the manner in which the slices are allocated across physical disks can have an enormous impact on the performance of the storage array. A naïve approach to allocation of storage for sparsely populated logical units, i.e., one that does not take into consideration the underlying physical and temporal constraints of the storage array in general and of the FLU pool in particular, may fail to meet the goals of the policy, such as green or brown for example, chosen by the administrator of the storage array. For example, if the administrator desires to maximize performance—i.e., a brown policy—a storage processor using a naïve allocation method might allocate all of the slices from a single physical disk, in which case the performance of the entire array may be needlessly constrained by the single disk and thus fail to meet the performance goals of the brown policy.

Accordingly, in order to avoid potential pitfalls that are inherent in a naïve approach to allocation of physical storage in a disk array, there exists a need for an informed approach to allocation that considers the underlying physical and temporal constraints of the disk array. Specifically, there exists a need for methods, systems, and computer readable medium for allocating physical storage in a storage array.

SUMMARY

According to one aspect, the subject matter described herein includes a method for allocating portions of storage area of a storage array. The method includes receiving, from a requesting entity, a request for allocation of a portion of storage area of a storage array, the storage array comprising multiple storage entities and multiple data buses for transferring data to and from storage entities, where the storage entities are organized into at least one logical unit, and each logical unit is subdivided into at least one slice. In response to receiving the request for allocation, at least one slice is selected for allocation for use by the requesting entity, based on anticipated system resource utilization during access to data to be stored in the storage array.

According to another aspect, the subject matter described herein includes a method for allocating portions of storage area of a storage array. The method includes receiving, from a requesting entity, a request for allocation of a portion of storage area of a storage array, the storage array comprising multiple storage entities and multiple data buses for transferring data to and from the multiple storage entities, where the multiple storage entities are organized into at least one logical unit, and wherein each logical unit is subdivided into at least one slice. In response to receiving the request for allocation, at least one slice is selected for allocation for use by the requesting entity, based on the number of allocated slices associated with each bus, the number of slices allocated from each storage entity, and/or the number of slices allocated from each logical unit.

According to yet another aspect, the subject matter described herein includes a system for allocating portions of storage area of a storage array. The system includes a storage array including multiple storage entities for storing data, where the storage entities are organized into at least one logical unit, and each logical unit is subdivided into at least one slice. The system also includes at least one storage processor for receiving, from a requesting entity, a request for allocation of a portion of the storage array, and in response to receiving the request for allocation, selecting at least one slice for allocation for use by the requesting entity, based on anticipated utilization of storage array resources during access to data to be stored in the storage array. The system also includes multiple data buses for transferring data between the at least one storage processor and the multiple storage entities.

According to yet another aspect, the subject matter described herein includes a system for allocating portions of storage area of a storage array. The system includes a storage array including multiple storage entities for storing data, where the multiple storage entities are organized into at least one logical unit, and where each logical unit is subdivided into at least one slice. The system also includes at least one storage processor for receiving, from a requesting entity, a request for allocation of a portion of the storage array, and, in response to receiving the request for allocation, selecting at least one slice for allocation for use by the requesting entity, based on the number of allocated slices associated with each bus, the number of slices allocated from each storage entity, and/or the number of slices allocated from each logical unit. The system also includes multiple data buses for transferring data between the at least one storage processor and the multiple storage entities.

The subject matter described herein for allocating physical storage in a disk array may be implemented in software in combination with hardware and/or firmware. As such, the terms "function" or "module" as used herein refer to software in combination with hardware and/or firmware for implementing the feature being described. In one exemplary implementation, the subject matter described herein may be implemented using a non-transitory computer readable medium having stored thereon computer executable instructions that when executed by the processor of a computer perform steps.

Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable medium are provided for allocating physical storage for mapped and thin logical units.

Figure 1A:
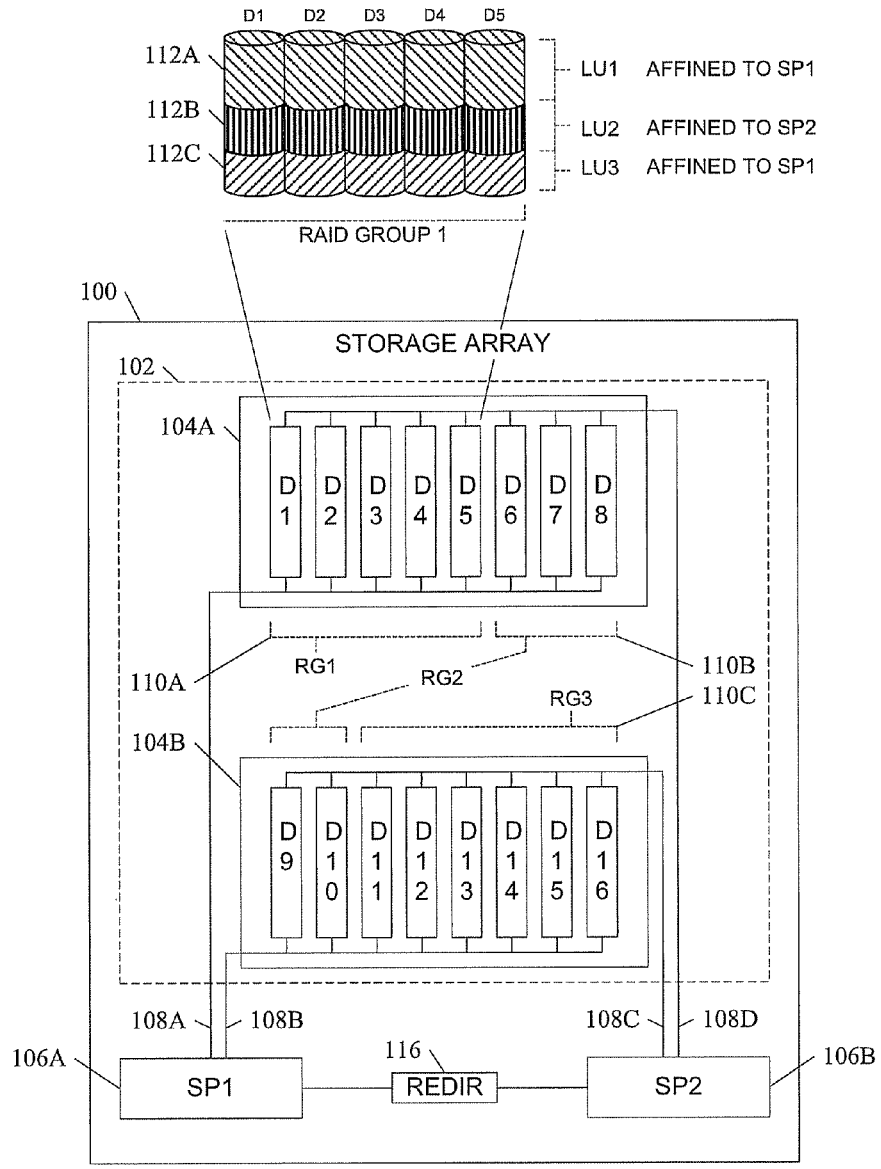
FIG. 1A is a block diagram illustrating a system for allocating physical storage in a storage array according to an embodiment of the subject matter described herein.

FIG. 1A is a block diagram illustrating a system for allocating physical storage in a storage array according to an embodiment of the subject matter described herein. Storage array 100 includes multiple storage devices 102, which are typically hard disk drives, but which may be tape drives, flash memory, flash drives, other solid state drives, or some combination of the above. In one embodiment, the storage devices may be organized into multiple shelves 104, each shelf containing multiple devices 102. In the embodiment illustrated in FIG. 1A, storage array 100 includes two shelves, Shelf1 104A and Shelf2 104B; Shelf1 104A contains eight storage devices, D1-D8, and Shelf2 also contains eight storage devices, D9-D16.

Storage array 100 may include one or more storage processors 106, for handling input/output (I/O) requests and allocations. Each storage processor 106 may communicate with storage devices 102 through one or more data buses 108. In one embodiment, storage array 100 contains two storage processors, SP1 106A, and SP2 106B, and each storage processor 106 has a dedicated data bus 108 for each shelf 104. For example, SP1 106A is connected to each storage device 102 on Shelf1 104A via a first data bus 108A and to each storage device 102 on Shelf2 104B via a second data bus 108B. SP2 106 is connected to each storage device 102 on Shelf1 104A via a third data bus 108C and to each storage device 102 on Shelf2 104B via a fourth data bus 108D. In this manner, each device 102 is configured to be connected to two separate data buses 108, one to each storage processor 106. For example, storage devices D1-D8 may be connected to data buses 108A and 108C, while storage devices D9-D16 may be connected to data buses 108B and 108D. Thus, each device 102 is connected via some data bus to both SP1 106A and SP2 106B. The configuration of storage array 100, as illustrated in FIG. 1A, is for illustrative purposes only, and is not considered a limitation of the subject matter described herein.

In addition to the physical configuration, storage devices 102 may also be logically configured. For example, multiple storage devices 102 may be organized into redundant array of inexpensive disks (RAID) groups, or RGs 110, shown in FIG. 1A as RG1 110A, RG2 110B, and RG3 110C. Storage devices D1-D5 are organized into a first RAID group, RG1 110A, while storage devices D6-D10 are organized into a second RAID group, RG2 110B. Storage devices D12-D16 are organized into a third RAID group, RG3 110C. In one embodiment, a RAID group may span multiple shelves and/or multiple buses. For example, RG2 110B includes storage devices from both Shelf1 104A and Shelf2 104B.

Although RAID groups are composed of multiple storage devices, a RAID group may be conceptually treated as if it were a single storage device. As used herein, the term "storage entity" may refer to either a single storage device or a RAID group operating as a single storage device.

Storage entities may be further sub-divided into logical units. A single RAID group or individual storage device may contain one or more logical units. Each logical unit may be further subdivided into portions of a logical unit, referred to as "slices". In the embodiment illustrated in FIG. 1A, RG1, which includes storage devices D1-D5, is sub-divided into 3 logical units, LU1 112A, LU2 112B, and LU3 112C.

Figure 1B:
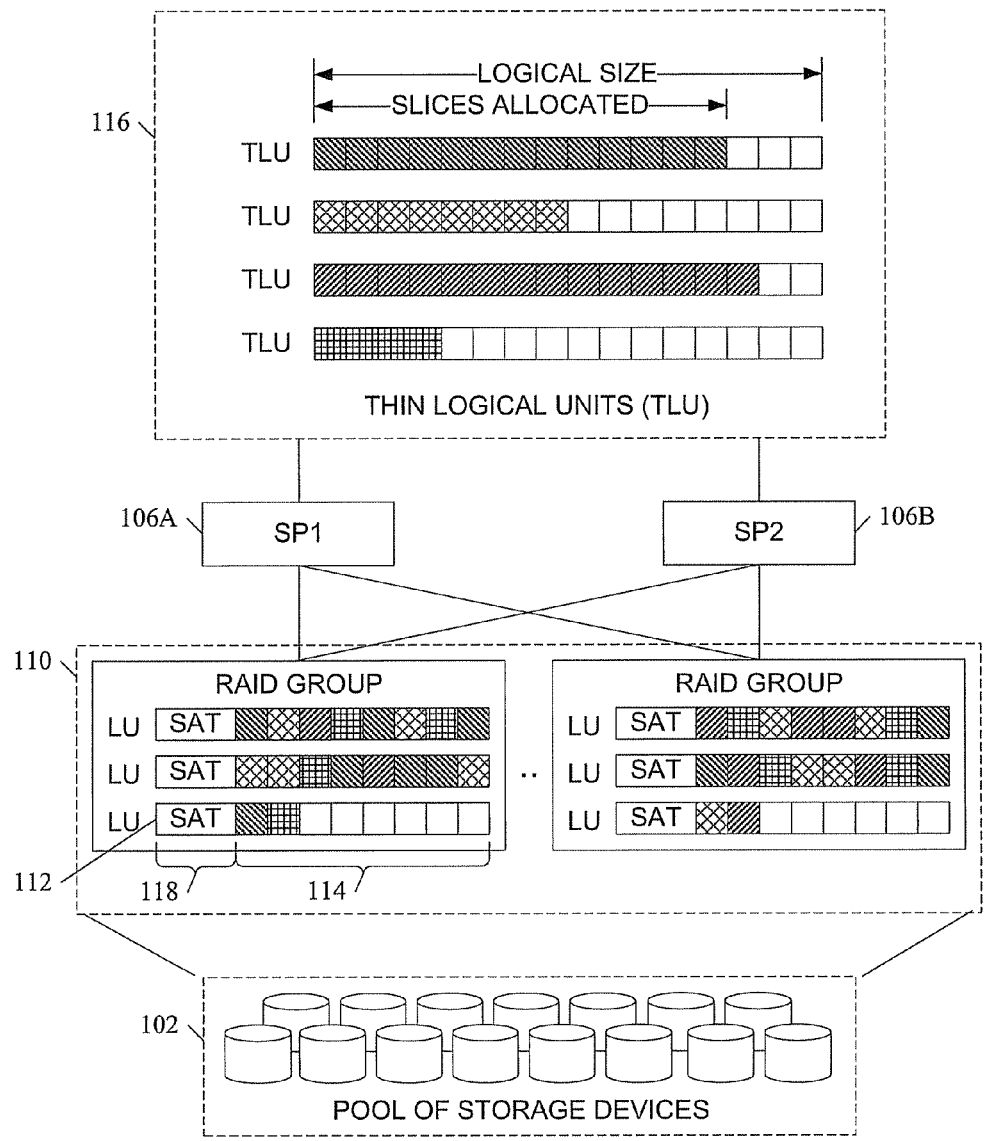
FIG. 1B is a block diagram illustrating another view of a system for allocating physical storage in a storage array according to an embodiment of the subject matter described herein.

FIG. 1B is a block diagram illustrating another view of a system for allocating physical storage in a storage array according to an embodiment of the subject matter described herein. In the simplified view shown in FIG. 1B, a pool of storage devices 102 are organized into multiple RAID groups 110, and each RAID group is further divided into a number of LUs from which slices 114 are allocated to one or more thin logical units (TLUs) 116. TLUs 116 may have a logical size that is larger than the current actual size. The actual size is determined by the number of slices actually allocated to the TLU 116. The slices that are allocated to a TLU 116 may be physically located anywhere in storage array 100. As will be discussed in more detail below, these slices may be located more or less contiguously, but they may also be distributed more or less evenly across all physical resources, depending on the slice selection and allocation policy or algorithm. Other physical distributions are within the scope of the subject matter claimed herein.

In one embodiment, storage processors 106 are responsible for allocating storage and maintaining information about how that allocated storage is being used. Storage processor 106 may maintain information about the structure of the file system whose contents are being stored in the allocated slices. In one implementation of storage array 100, each logical unit 112 is associated with a slice allocation table (SAT) 118, which is used to record information about each slice 114, such as the TLU that is using the slice 114 and whether the slice is free or allocated. The SAT 118 may be stored in the logical unit 112, or it may be stored outside the logical unit 112 to which it is associated.

In one embodiment, in order to avoid contention between two or more storage processors 106 attempting to modify a particular SAT 118, each SAT 118 is controlled by only one storage processor 106. The storage processor 106 that has been given ownership of a particular SAT 118 is hereinafter referred to as the "claiming SP" for that SAT 118. Since the SAT 118 for a logical unit 112 contains information about slices within that logical unit 112, the claiming SP of a SAT 118 may be said to be the claiming SP of the logical unit, also. The remaining storage processors 106 that are not the claiming SP for a logical unit 112 are hereinafter referred to as the "peer SP". Thus, every logical unit 112 may have one claiming SP and one or more peer SPs. Since the claiming SP may be determined for each logical unit 112 individually, logical units within the same RAID group 110 may have different claiming SPs.

As used herein, the term "affining" refers to the process of associating a logical unit 112 to a storage processor 106, which then becomes the claiming SP of that logical unit 112. The term "affinity" refers to a characteristic of a logical unit 112, the characteristic indicating the association of that logical unit 112 to a particular storage processor 106. A logical unit 112 is said to have an affinity for or toward a specific storage processor 106.

In one embodiment, if one storage processor 106 receives an I/O request for a slice that resides within a logical unit 112 that has been affined to another storage processor 106, that I/O request may be denied, since the first storage processor does not have access to the slice allocation table for the logical unit 112 in question. In an alternative embodiment, a request for I/O access to a particular logical unit 112 may be redirected from peer SP that received the request to the claiming SP via a redirector 116. However, redirection incurs a performance penalty due to the time taken to detect the improper request, identify the appropriate storage processor, and redirect the request to the identified storage processor.

Similarly, in one embodiment, a peer SP may not be permitted to have allocated to it slices from a logical unit 112 claimed by another SP. For example, referring to FIG. 1A, SP1 106A may not be allowed to have slices from LU2 112, since that LU has been affined to SP2 106B. In this scenario, the slices on LU2 1112 are said to be "orphaned" with respect to any peer SP, which in this example is any storage processor 106 other than SP2 106B. Thus, the slices on LU2 112 are orphaned with respect to SP1 106A. In an alternative embodiment, however, allocation of slices to a peer SP may be allowed, in a process hereinafter referred to as "poaching". However, like the I/O example above, poaching also incurs a redirection penalty.

Whether or not a slice may be allocated to a peer SP depends on the policy chosen by the user of the array, and what weight, if any, that policy gives to affinity. A policy may absolutely prohibit poaching, for example, or it may allow poaching only as a last resort, e.g., when there are no other slices available in the LUs that have been affined to the requesting SP. Alternatively, the policy may not consider affinity at all during its selection and allocation of slices. In embodiments where poaching is allowed, the SAT 118 may include information for each slice which identifies the poaching SP, i.e., storage processor 106 to which the slice has been allocated. Thus, in some embodiments, both the logical unit 112 and the slice may have affinity information associated with it.

Figure 2:
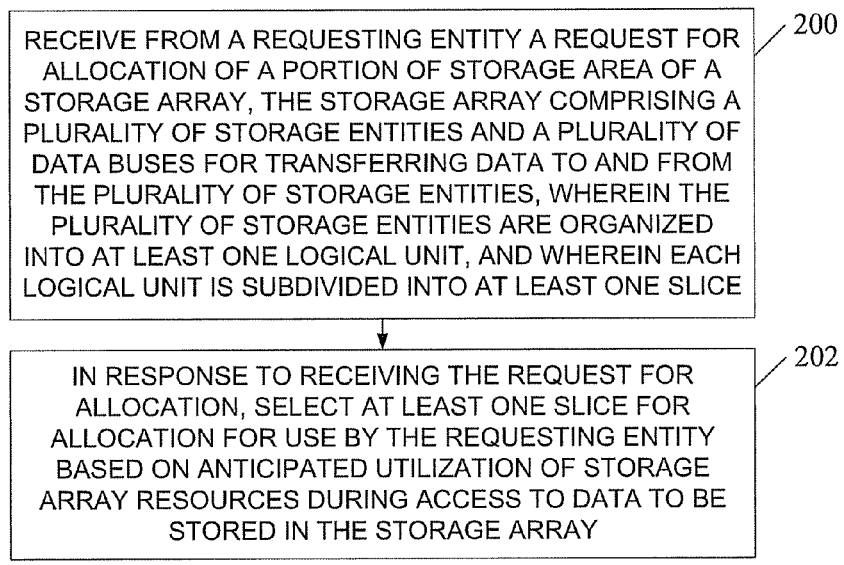
FIG. 2 is a flow chart illustrating an exemplary process for allocating physical storage in a storage array according to an embodiment of the subject matter described herein.

FIG. 2 is a flow chart illustrating an exemplary process for allocating physical storage in a storage array according to an embodiment of the subject matter described herein. At block 200, a request for allocation of a portion of storage area or the storage array is received from a requesting entity. The request for allocation may be an explicit allocation request, or it may be an implicit allocation request. An I/O write request is an example of the latter, since a storage processor may allocate additional storage space, if needed, to store the data being written.

At block 202, in response to receiving the request for allocation, a portion of storage area is selected for allocation to the requesting entity. The selection algorithm considers at least one of the following: the number of allocated slices associated with each bus; the number of slices allocated from each RAID group; and the number of slices allocated for each LU. The selection algorithm will be described in more detail with reference to FIGS. 3-5, below.

Figure 3:
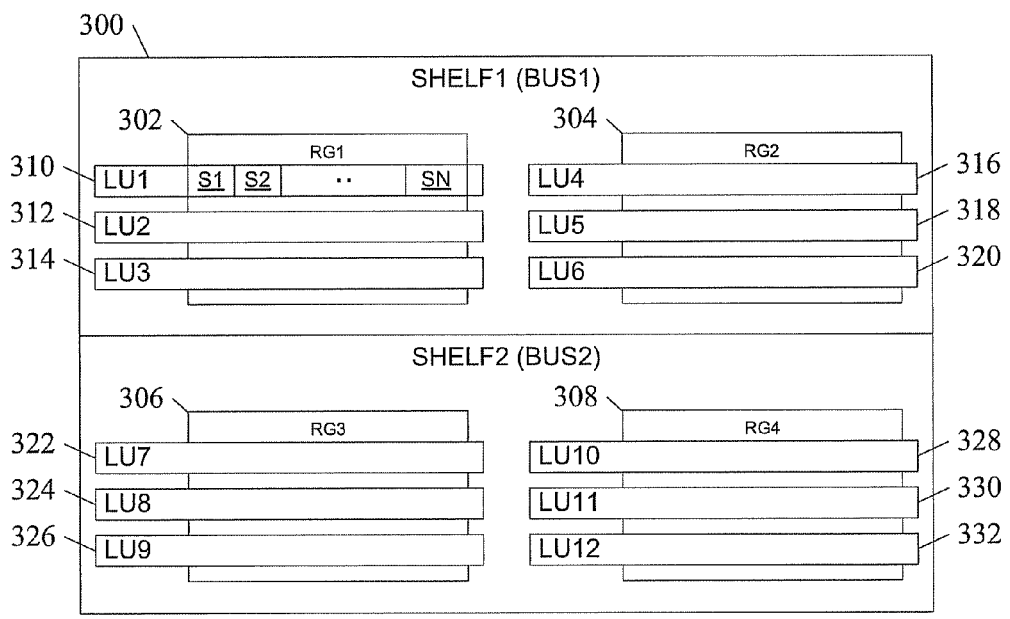
FIG. 3 is a simplified block diagram of an exemplary system for allocating physical storage in a storage array according to an embodiment of the subject matter described herein.

FIG. 3 is a simplified block diagram of an exemplary system for allocating physical storage in a storage array according to an embodiment of the subject matter described herein. In one embodiment, storage array 300 includes storage devices that have been logically organized into four RAID groups, RG1 302, RG2 304, RG3 306, and RG4 308, each of which has been further subdivided into three logical units each. The RAID groups are distributed across two shelves, each with its own bus. For clarity, the buses are not shown. RG1 302 has been divided into logical units LU1 310, LU2 312, and LU3 314; RG2 304 contains LU4 316, LU5 318, and LU6 320; RG3 306 contains LU7 322, LU8 324, and LU9 316; and RG4 308 contains LU10 328, LU11 330, and LU12 332.

Each logical unit LU1 310 through LU12 332 may be divided into slices. In the example embodiment illustrated in FIG. 3, LU1 310 has been divided into slices S1 through SN. The slices may all be the same size. Alternatively, the size of the slices may vary from RAID group to RAID group, from logical unit to logical unit, or even within one logical unit.

Figure 4:
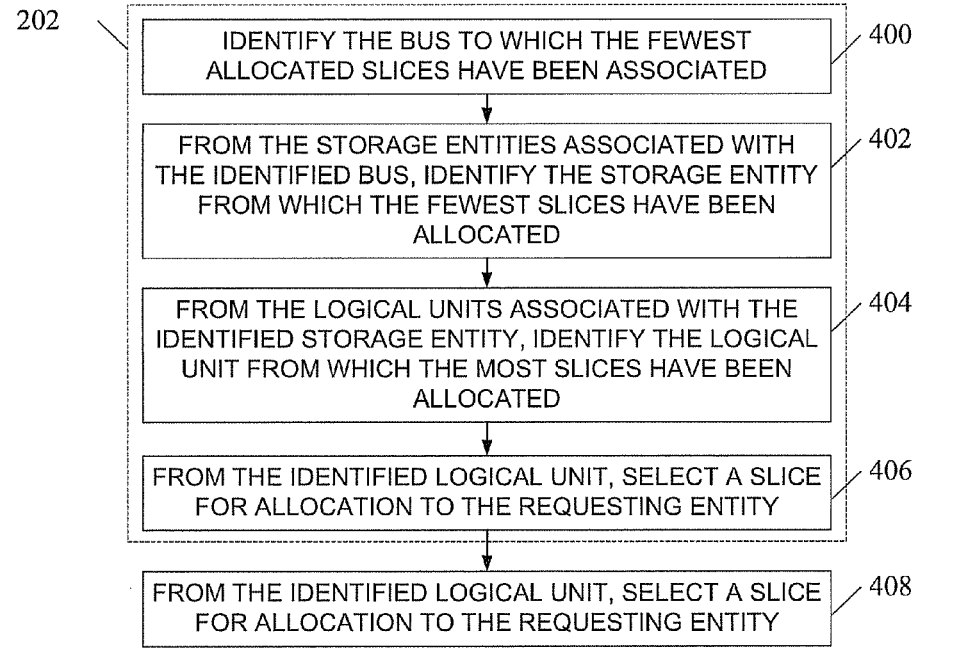
FIG. 4 is a flow chart and block diagram illustrating an exemplary selection algorithm that implements a high-performance, or brown, policy according to an embodiment of the subject matter described herein.
Figure 4:
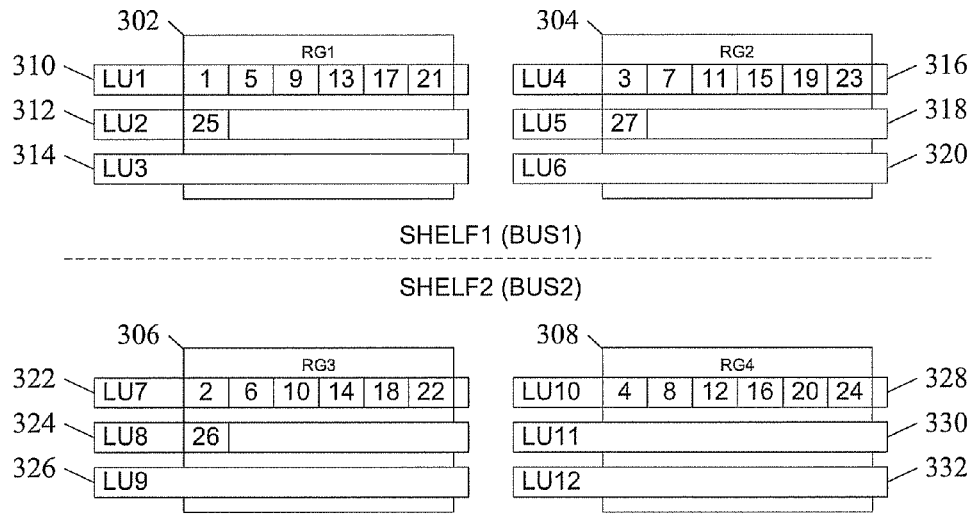

The selection algorithm may be tailored to implement certain goals or policies. For example, a "green" policy may be designed to lower the energy consumption of the storage array at the price of a reduction in performance, while a "brown" policy may be designed to maximize performance at the price of increased power consumption. FIGS. 3 and 4, below, illustrate exemplary embodiments of the brown and green polices, respectively.

FIG. 4 is a flow chart and block diagram illustrating an exemplary selection algorithm that implements a high-performance, or brown, policy according to an embodiment of the subject matter described herein. In one embodiment, slices are selected and allocated so as to distribute the operating load more or less equally among all physical resources, including buses, RAID groups, logical units and storage devices, thus maximizing performance.

At block 400, the bus to which the fewest allocated slices have been associated is identified. Referring to the portion of storage array 300 that is shown in FIG. 4, 14 slices have been allocated from devices associated with shelf1 and thus associated with bus1 (i.e., slices 1, 3, 5, 7, 9, 11, 13, 15, 17, 19, 21, 23, and 27), while only 13 slices have been allocated from devices associated with shelf2/bus2 (i.e., slices 2, 4, 6, 8, 10, 12, 14, 16, 18, 20, 22, and 24). Therefore, bus2 is identified as the bus with the fewest allocated slices.

At block 402, from among the RAID groups associated with the identified bus, the RAID group from which the fewest number of slices have been allocated, and which contains at least one unallocated slice, is identified. For example, RAID groups RG3 306 and RG4 308 are associated with bus2; 7 slices (2, 6, 10, 14, 18, 22, and 26) have been allocated from RG3 306 while only 6 slices (4, 8, 12, 16, 20, and 24) have been allocated from RG4 308. Therefore, RG4 308 is identified as the RAID group with the fewest allocated slices.

In one embodiment, if a RAID group spans multiple buses, only the slices residing within storage devices 102 that physically exist on that bus are counted. Alternatively, the number of slices attributed to each bus will be equal to the total number of slices allocated within the RAID group multiplied by the ratio of storage devices on each bus over the total number of storage device in the RAID group. For example, referring to FIG. 1A, RG2 110B is comprised of three storage devices on bus 1 (e.g., 108A) and two storage devices on bus 2 (e.g., 108B). If 100 slices have been allocated from RG2 110B, for example, 60 slices will be attributed to bus 1 (100× 3/5=60) and 40 slices will be attributed to bus 2 (100×2/5=40).

At block 404, from the LUs associated with the identified RAID group, the LU from which the most number of slices have been allocated, and which contains at least one unallocated slice, is identified. For example, the identified RAID group RG4 308 contains logical units LU10 328, LU11 330, and LU12 332; LU10 328 has the most number of slices allocated (6), but it does not contain at least one unallocated slice. Both LU11 330 and LU12 332 have the same number of slices (i.e., none), and so the slice selection algorithm may reasonably choose either of these two logical units from which to select and allocate a slice. In one embodiment, the next logical unit within a raid group may be selected using a round-robin technique, in which case LU10 328, LU11 330, and LU12 332, in that order, may be selected as the logical unit from which to allocate the next slice. Using this technique, LU11 330 would be the LU from which the next slice would be allocated. Alternatively, other parameters may be used to choose the next logical unit. For example, a logical unit may be selected based on the sizes of the available slices. In embodiments where one storage processor may be given priority over other storage processors to allocate slices from particular logical units, this priority may also be considered during the selection of the logical unit.

In the embodiment illustrated in FIG. 4, the algorithm is tuned so that all slices are allocated from one logical unit before any slices are allocated from a second logical unit within the same raid group. Such an algorithm reflects a physical constraint of a hard disk drive—namely, that a logical unit is a collection of logically contiguous sectors, which are usually physically contiguous sectors, tracks, and cylinders. Thus, accessing slices within one logical unit involves less read/write head and arm swing than does accessing slices from two different logical units. Since arm swing can contribute a relatively significant delay to the I/O access time, reducing arm swing can improve performance. Alternative algorithms that also consider the underlying physical and temporal constraints of the storage array are also within the scope of the subject matter described herein. For example, it is conceivable that hard disk drives may have two independent sets of read/write arms, in which case the algorithm might begin allocating slices from two logical units within a raid group in parallel, rather than allocating all slices from one logical unit before starting to allocate slices from a second logical unit.

At block 406, a slice is selected from the identified LU, and at block 408, the selected slice is allocated to the requested entity. In one embodiment, the allocation of the slice in block 408 may be deferred or even not performed at all. For example, an array administrator may desire to provision a certain amount of storage space in a manner that guarantees that the requested amount of space actually exists in the FLU pool. This has particular consequences with regard to TLUs, which by definition do not actually allocate slices of storage until the host actually starts writing data to the array, since allocation of the entire requested but as-yet-unused storage space would make that space unavailable for use by anyone else—thus defeating the purpose and advantages of using thin LUs. To satisfy the conflicting needs of the host (guaranteed actual space) and the thin LU (deferring allocation until actual use), the subject matter described herein includes the concept of "reservation", in which slices are affined to the storage processor that is handling the provisioning request from the host but the slices are not yet allocated to the TLU. Reservation guarantees that a TLU will have enough physical storage space, e.g., from the FLU pool, if needed, but the storage processor has the flexibility to defer a decision about which slices in particular will be allocated to the TLU.

In one embodiment, upon receipt of a request for guaranteed storage space, storage processor 106 may first determine whether there are enough unallocated slices available within the logical units 112 that have been affined to it and if not, attempt to affine additional logical units 112 as necessary. Once there is a sufficient number of unallocated slices available to storage processor 106, it will allocate slices only as needed while ensuring that it has enough affined but unallocated slices to provide the total amount provisioned if necessary.

In one embodiment, each slice may be affined to a particular storage processor. In these embodiments, the user policy regarding affinity may inform and affect the selection process. For example, in a policy that absolutely prohibits poaching, those logical units that are not affined to the storage processor which received the allocation request may be excluded from consideration by the selection process. This may result in identification of a completely different bus, storage entity, or logical unit from which to allocate a slice than would have been identified under a policy which allows poaching.

Figure 5:
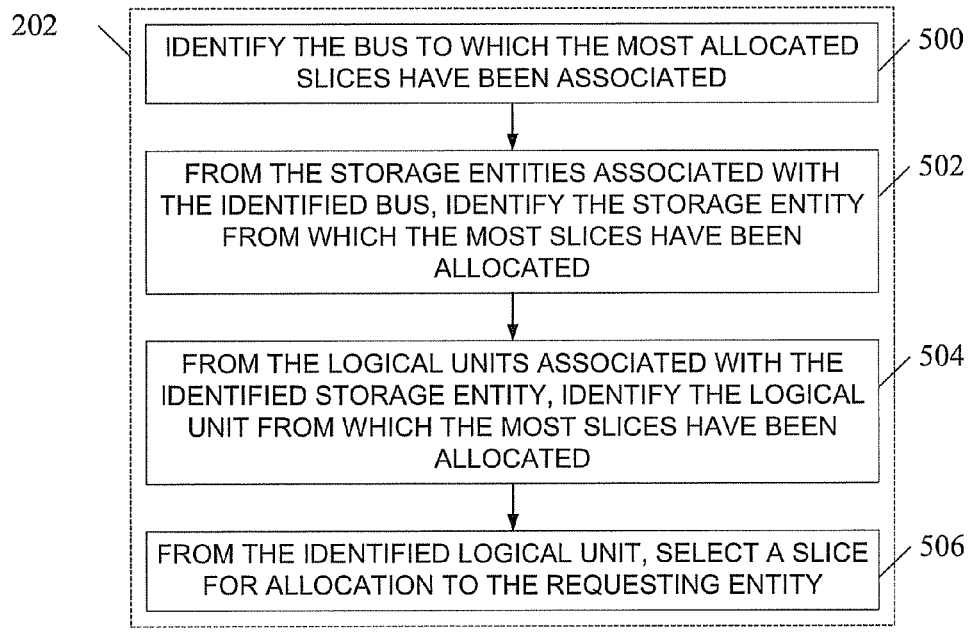
FIG. 5 is a flow chart and block diagram illustrating an exemplary selection algorithm that implements a low-power, or green, policy according to an embodiment of the subject matter described herein.
Figure 5:
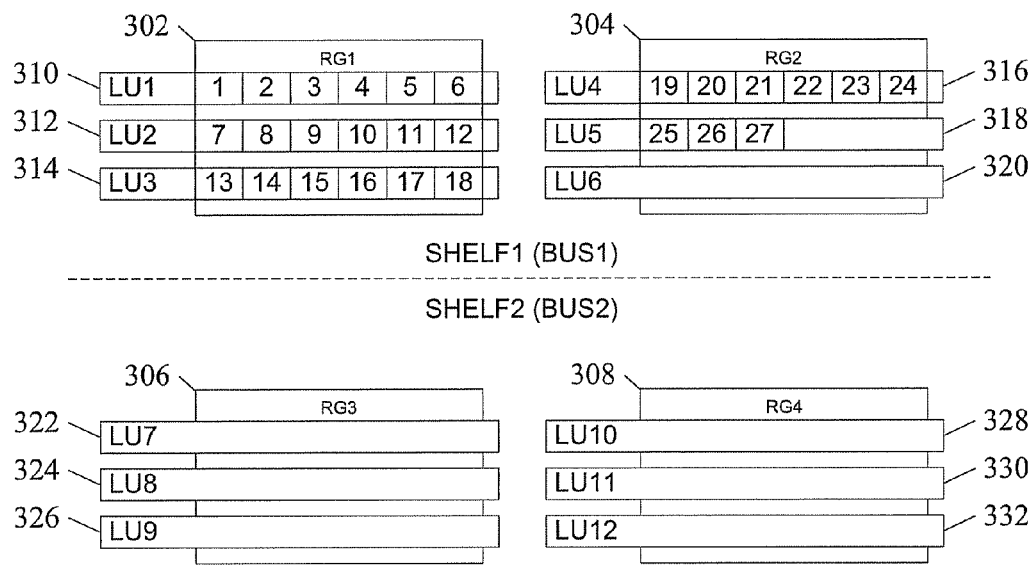

FIG. 5 is a flow chart and block diagram illustrating an exemplary selection algorithm that implements a low-power, or green, policy according to an embodiment of the subject matter described herein. In one embodiment, slices are allocated in a manner so as to minimize the number of resources that will be active at any one time.

At block 500, in response to receiving a request for allocation, the bus to which the most allocated slices have been associated, and which contains at least one unallocated slice, is identified. Referring to the portion of storage array 300 that is shown in FIG. 5, only bus1 includes storage devices from which slices have been allocated, and there are unallocated slices still available on bus1. Thus, bus1 is identified as a bus to which allocated slices have been associated.

At block 502, from the storage entities, which in this example are RAID groups, associated with the identified bus, a RAID group from which the most slices have been allocated, and which contains at least one unallocated slice, is identified. In FIG. 5, RG1 302 is the storage entity from which the most slices have been allocated, but RG1 302 does not contain any unallocated slices. RG2 304 is the storage entity from which the next largest number of slices have been allocated, and RG2 304 does include at least one unallocated slice. Thus, RG2 304 is identified as a RAID group containing a logical unit from which a slice has been allocated and which contains at least one unallocated slice.

At block 504, from the logical units associated with the identified storage entity, the logical unit containing the most allocated slices, and which contains at least one allocated slice, is identified. In FIG. 5, only LU5 318 meets this requirement. Thus, LU5 318 is identified as the logical unit from which to allocate a slice.

At block 506, a slice is a selected from the identified LU for allocation to the requesting entity. Unless the slice is to be reserved rather than allocated, the selected slice is allocated to the requesting entity.

The green and brown policies described above in FIGS. 4 and 5, respectively, are only two examples of possible policies and their associated algorithms. Other policies, and variations on the green and brown policies, are within the scope of the subject matter described herein. For example, a storage array administrator may, by setting a "raid group fill threshold", create a policy that is somewhere in between green and brown. If the RG fill threshold is set to 100%, meaning that one RG must be 100% allocated before another RG may be tapped for allocation of slices to a TLU, this looks like a green policy, since it tends to minimize the number of devices that are active at any one time. On the other hand, setting the RG fill threshold to 0% causes the allocation algorithm to act like a brown policy, allocating in parallel from as many RGs as are available. By adjusting this and a variety of other parameters, a storage array administrator may find the desired balance between performance and power consumption, for example, or otherwise tune the operation of the storage array.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for allocating portions of storage area of a storage array, the method comprising:
   receiving, from a requesting entity, a request for allocation of a portion of storage area of a storage array, the storage array comprising a plurality of storage entities and a plurality of data buses for transferring data to and from the plurality of storage entities, wherein the plurality of storage entities is organized into at least one logical unit, and wherein each logical unit is subdivided into at least one slice;
   in response to receiving the request for allocation, selecting at least one slice for allocation for use by the requesting entity, wherein the at least one slice is selected based on anticipated utilization of storage array resources during access to data after it has been stored in the storage array, wherein selecting at least one slice for allocation includes reserving the at least one slice for use by a storage processor but not allocating the at least one slice to a logical unit until the slice is actually needed by the requesting entity;
   wherein each allocated slice is associated with one of the plurality of buses;
   wherein the selection is based on at least one of the number of allocated slices associated with each bus, the number of slices allocated from each storage entity, and the number of slices allocated from each logical unit; and
   wherein only slices that satisfy an affinity requirement are counted in determining the number of allocated slices associated with each bus, the number of slices allocated from each storage entity, and the number of slices allocated from each logical unit.

2. The method of claim 1 comprising allocating the selected at least one slice to the requesting entity.

3. The method of claim 1 wherein each storage entity comprises one of a single storage device and a plurality of storage devices organized into a redundant array and wherein each storage device comprises one of a hard disk drive, a floppy disk drive, a tape drive, a solid state drive, a flash memory, and a flash drive.

4. The method of claim 3 wherein the redundant array comprises a redundant array of inexpensive disks (RAID) group.

5. The method of claim 1 wherein the storage array resources include at least one of data buses, storage entities, logical units, and slices.

6. The method of claim 1 wherein selecting the at least one slice includes:
   identifying the bus to which the fewest allocated slices have been associated;
   identifying, from storage entities associated with the identified bus, a storage entity from which the fewest slices have been allocated;
   identifying, from logical units associated with the identified storage entity, a logical unit from which the most slices have been allocated; and
   selecting a slice from the identified logical unit for allocation to the requesting entity.

7. The method of claim 1 wherein selecting a portion of storage area includes:
   identifying a bus to which the most allocated slices have been associated;
   identifying, from storage entities associated with the identified bus, a storage entity from which the most slices been allocated;
   identifying, from the logical units associated with the identified storage entity, a logical unit from which the most slices have been allocated; and
   selecting a slice from the identified logical unit for allocation to the requesting entity.

8. A method for allocating portions of storage area of a storage array, the method comprising:
   receiving, from a requesting entity, a request for allocation of a portion of storage area of a storage array, the storage array comprising a plurality of storage entities and a plurality of data buses for transferring data to and from the plurality of storage entities, wherein each of the plurality of storage entities communicates with a plurality of data buses, wherein the plurality of storage entities is organized into at least one logical unit, and wherein each logical unit is subdivided into at least one slice;
   in response to receiving the request for allocation, selecting at least one slice for allocation for use by the requesting entity, wherein the at least one slice is selected based on at least one of the number of allocated slices associated with each bus, the number of slices allocated from each storage entity, and the number of slices allocated from each logical unit, wherein selecting at least one slice for allocation includes reserving the at least one slice for use by a storage processor but not allocating the at least one slice to a logical unit until the slice is actually needed by the requesting entity;
   wherein each allocated slice is associated with one of the plurality of buses; and
   wherein only slices that satisfy an affinity requirement are counted in determining the number of allocated slices associated with each bus, the number of slices allocated from each storage entity, and the number of slices allocated from each logical unit.

9. A system for allocating portions of storage area of a storage array, the system comprising:
   a storage array, comprising a plurality of storage entities for storing data, wherein the plurality of storage entities is organized into at least one logical unit, and wherein each logical unit is subdivided into at least one slice;
   at least one storage processor for receiving, from a requesting entity, a request for allocation of a portion of the storage array and in response to receiving the request for allocation, selecting, based on anticipated utilization of storage array resources during access to data after it has been stored in the storage array, at least one slice for allocation for use by the requesting entity, wherein selecting at least one slice for allocation includes reserving the at least one slice for use by the at least one storage processor but not allocating the at least one slice to a logical unit until the slice is actually needed by the requesting entity;

a plurality of data buses for transferring data between the at least one storage processor and the plurality of storage entities;

wherein each allocated slice is associated with one of the plurality of data buses;

wherein the at least one storage processor is configured to select the at least one slice based on at least one of the number of allocated slices associated with each bus, the number of slices allocated from each storage entity, and the number of slices allocated from each logical unit; and wherein only slices that satisfy an affinity requirement are counted in determining the number of allocated slices associated with each bus, the number of slices allocated from each storage entity, and the number of slices allocated from each logical unit.

10. The system of claim 9 wherein the at least one storage processor is configured to allocate the selected at least one slice to the requesting entity.

11. The system of claim 9 wherein each of the plurality of storage entities is connected to at least two of the plurality of data buses.

12. The system of claim 9 wherein each storage entity comprises one of a single storage device and a plurality of storage devices organized into a redundant array and wherein each storage device comprises one of a hard disk drive, a floppy disk drive, a tape drive, a solid state drive, a flash memory, and a flash drive.

13. The system of claim 12 wherein the redundant array comprises a redundant array of inexpensive disks (RAID) group.

14. The system of claim 9 wherein the at least one storage processor is configured to select the at least one slice based on identifying the bus to which the fewest allocated slices have been associated; identifying, from storage entities associated with the identified bus, a storage entity from which the fewest slices have been allocated; identifying, from logical units associated with the identified storage entity, a logical unit from which the fewest slices have been allocated; and selecting a slice from the identified logical unit for allocation to the requesting entity.

15. The system of claim 9 wherein the at least one storage processor is configured to select the at least one slice based on identifying a bus to which the most allocated slices have been associated; identifying, from storage entities associated with the identified bus, a storage entity from which the most slices been allocated; identifying, from the logical units associated with the identified storage entity, a logical unit from which the most slices have been allocated; and selecting a slice from the identified logical unit for allocation to the requesting entity.

16. The system of claim 9 wherein each of the at least one logical units is associated with a slice allocation table for maintaining allocation information for slices within the logical unit.

17. The system of claim 9 wherein each of the at least one logical units is affined to one of the at least one storage processor.

18. The system of claim 17 wherein the at least one storage processor comprises a plurality of storage processors, wherein the system further comprises a redirector for redirecting requests from a first processor from the plurality of storage processors to a second processor from the plurality of storage processors, and wherein the first storage processor is configured to receive a request associated with a logical unit that has been affined to the second storage processor, and in response to receiving the request, send the request to the redirector for redirection to the second storage processor.

19. A system for allocating portions of storage area of a storage array, the system comprising:

a storage array, comprising a plurality of storage entities for storing data, wherein the plurality of storage entities is organized into at least one logical unit, and wherein each logical unit is subdivided into at least one slice;

at least one storage processor for receiving, from a requesting entity, a request for allocation of a portion of the storage array, and, in response to receiving the request for allocation, selecting, based on at least one of the number of allocated slices associated with each bus, the number of slices allocated from each storage entity, and the number of slices allocated from each logical unit, at least one slice for allocation for use by the requesting entity, wherein selecting at least one slice for allocation includes reserving the at least one slice for use by the at least one storage processor but not allocating the at least one slice to a logical unit until the slice is actually needed by the requesting entity;

a plurality of data buses for transferring data between the at least one storage processor and the plurality of storage entities wherein each of the plurality of storage entities communicates with a plurality of data buses;

wherein each allocated slice is associated with one of the plurality of data buses; and wherein only slices that satisfy an affinity requirement are counted in determining the number of allocated slices associated with each bus, the number of slices allocated from each storage entity, and the number of slices allocated from each logical unit.

20. A non-transitory computer readable medium having stored thereon computer executable instructions that when executed by the processor of a computer perform steps comprising:

receiving, from a requesting entity, a request for allocation of a portion of storage area of a storage array, the storage array comprising a plurality of storage entities and a plurality of data buses for transferring data to and from the plurality of storage entities, wherein the plurality of storage entities is organized into at least one logical unit, wherein each logical unit is subdivided into at least one slice;

in response to receiving the request for allocation, selecting, based on anticipated system resource utilization during access to data that has been stored in the storage array, at least one slice for allocation for use by the requesting entity, wherein selecting at least one slice for allocation includes reserving the at least one slice for use by a storage processor but not allocating the at least one slice to a logical unit until the slice is actually needed by the requesting entity;

wherein each allocated slice is associated with one of the plurality of buses;

wherein the selection is based on at least one of the number of allocated slices associated with each bus, the number of slices allocated from each storage entity, and the number of slices allocated from each logical unit; and wherein only slices that satisfy an affinity requirement are counted in determining the number of allocated slices associated with each bus, the number of slices allocated from each storage entity, and the number of slices allocated from each logical unit.

\* \* \* \* \*